No. 624,939.  
W. HOWARD.  
SPINNING MULE.  
(Application filed June 4, 1898.)  
(No Model.)  
Patented May 16, 1899.  
3 Sheets—Sheet I.
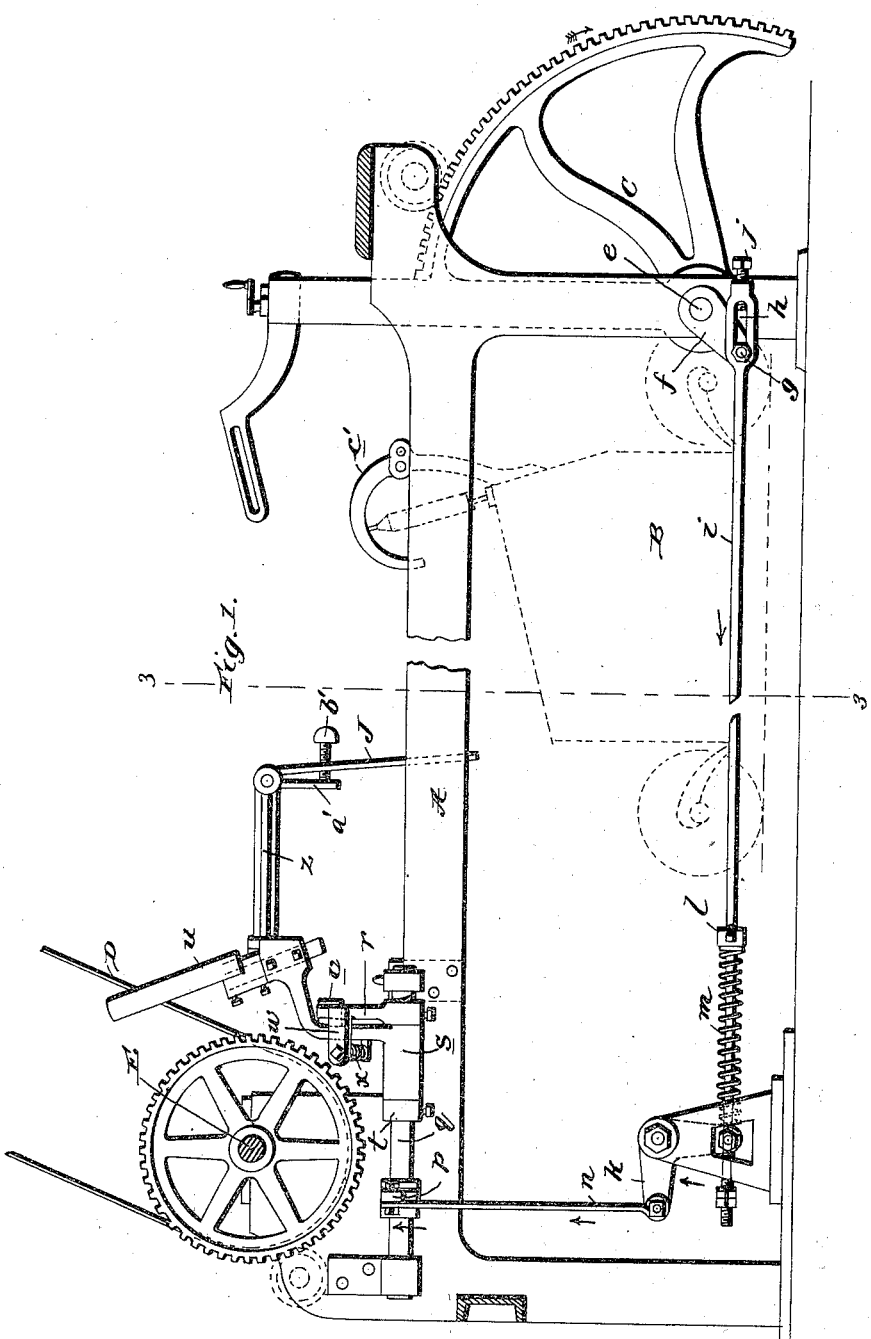

No. 624,939. Patented May 16, 1899.
W. HOWARD.
SPINNING MULE.
(Application filed June 4, 1898.)
(No Model.) 3 Sheets—Sheet 2.
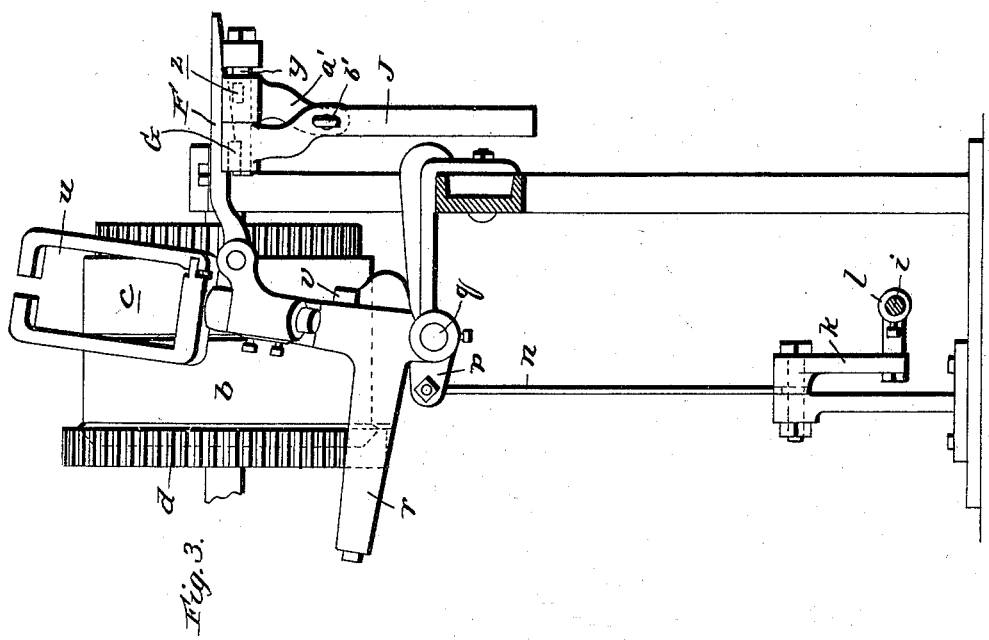
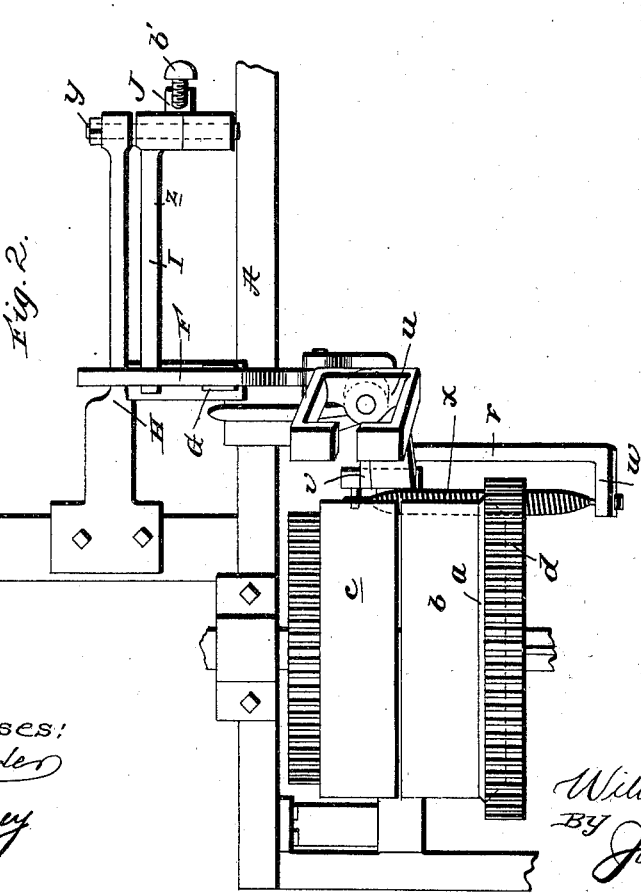

No. 624,939. Patented May 16, 1899.
W. HOWARD.
SPINNING MULE.
(Application filed June 4, 1898.)
(No Model.) 3 Sheets—Sheet 3.
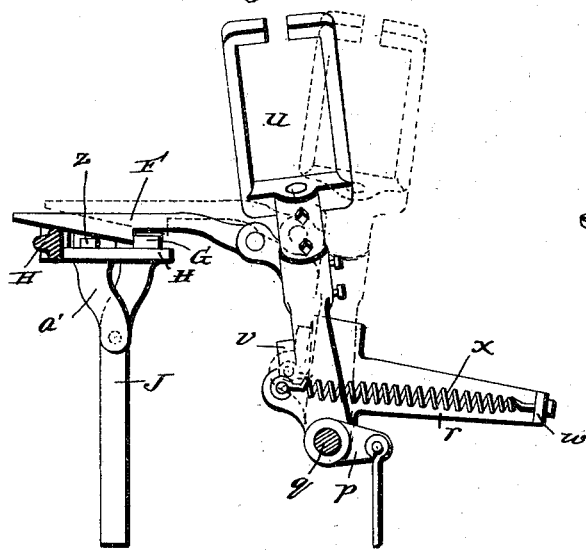
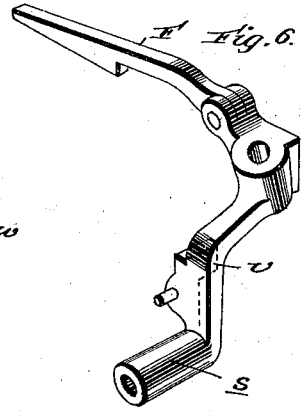
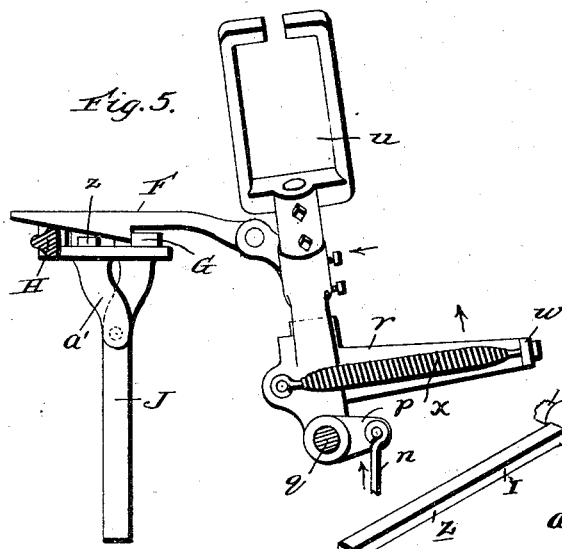
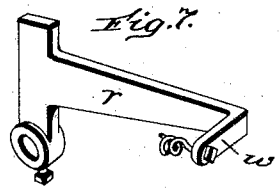
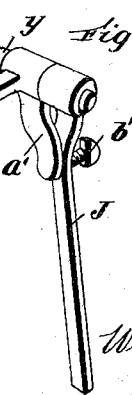

UNITED STATES PATENT OFFICE.

WILLIAM HOWARD, OF WOONSOCKET, RHODE ISLAND, ASSIGNOR OF ONE-HALF TO EDWARD HILTON, OF SAME PLACE.

SPINNING-MULE.

SPECIFICATION forming part of Letters Patent No. 624,939, dated May 16, 1899.

Application filed June 4, 1898. Serial No. 682,589. (No model.)

*To all whom it may concern:*

Be it known that I, WILLIAM HOWARD, a citizen of the United States, residing at Woonsocket, in the county of Providence and State of Rhode Island, have invented new and useful Improvements in Spinning - Mules, of which the following is a specification.

My invention relates to self-acting spinning-mules, and more particularly to belt-shipping mechanism therefor.

The general object of the invention is to provide a self-actor mule with a belt-shipping mechanism which is governed by the speed of the mule, preferably through the quadrant, and is arranged to gradually shift the belt from the fast pulley to the loose pulley on the main drive-shaft and secure it in such position as the mule-carriage is making its outward run, and is also arranged to release the belt and quickly shift the same from the loose to the fast pulley incident to the inward or "winding - on" movement of the carriage. This manner of shifting the belt is advantageous, because the gradual shifting of the belt from the fast pulley to the loose pulley incident to the outward run of the carriage prevents breakages and also prevents wear on the belt and obviates burning and wear of the friction-disk, inasmuch as the shifting is accomplished—*i. e.*, the belt is caused to leave the fast pulley—before the gear on the main drive-shaft, which is designed to transmit the backing - off movement to the spindles, is moved into engagement with the friction-disk, and in consequence the friction-disk has only the momentum of the carriage to overcome and is enabled to quickly accomplish the backing off of the spindles. The shipping of the belt being governed by the speed of the mule, as stated, the mechanism when once set and regulated requires no alteration from one count of yarn to another.

With the foregoing in view the invention will be fully understood from the following description and claims when taken in conjunction with the annexed drawings, in which—

Figure 1 is a side elevation of so much of a self-actor mule as is necessary to illustrate my invention. Fig. 2 is a detail top plan illustrating the main drive-shaft and its appurtenances, together with a belt and a portion of the belt - shifting mechanism. Fig. 3 is a transverse section taken in the plane indicated by the line 3 3 of Fig. 1. Figs. 4, 5, 6, 7, and 8 are perspective views of certain details which will be hereinafter referred to.

In the said drawings similar letters designate corresponding parts in all of the several views, referring to which—

A is the main frame of a self-actor mule.

B is the carriage, which is drawn in and out through the medium of scrolls and ropes or other suitable means, which form no part of my invention and are therefore not illustrated.

C is the quadrant for regulating the winding on, said quadrant gaining its motion from the carriage in the usual manner through the medium of the ordinary well-known mechanism, which it is not deemed necessary to illustrate.

D is the drive-belt, and E is the main drive-shaft, which bears the fast friction-disk $a$, the fast and loose pulleys $b$ $c$, and the gear-wheel $d$, said gear-wheel being loose on the shaft and arranged to engage the friction-disk $a$ and having for its purpose to effect, through the medium of the ordinary mechanism, (not shown,) the backing off of the spindles when it is placed in engagement with said disk by the well-known mechanism, which forms no part of my invention and is therefore not shown herein.

On the shaft $e$ of the quadrant C is a crank $f$, the same being provided with a lateral projection $g$, which takes loosely through a slot $h$ in a pitman $i$ and is designed to impinge against the inner end of the slot and also against an adjustable screw $j$ at the outer end thereof for a purpose presently described. The pitman $i$ extends loosely through an eye in one arm of a bell-crank lever $k$ and is provided with an adjustable collar $l$ and a spring $m$, the latter being interposed between the collar $l$ and the said arm of the lever, so as to serve, in conjunction with the slot $h$, to effect an end hereinafter pointed out. The other or upper arm of the said bell-crank lever $k$ is connected by a pitman $n$ with an arm $p$, fixed on a rock-shaft $q$. (Better illustrated in Figs. 1 and 2 of the drawings.)

In addition to the arm $p$, the rock-shaft $q$ is provided with a lever $r$, fast thereon, and a loosely-mounted belt-shipping lever $s$, said lever $s$ being interposed between the lever $r$ and a collar $t$, as shown. The lever $s$ is provided with the usual fork $u$ to receive the belt D, and also with a lateral lug $v$ for the engagement of the lever $r$. The lever $r$ in turn is provided with a lateral arm $w$, which rests in rear of the lever $s$ with respect to the direction in which said lever $s$ is thrown to shift the belt from the fast to the loose pulley and is designed for the connection of one end of a coiled spring $x$, the opposite end of which is connected to the belt-shipping lever $s$, as best shown in Figs. 4 and 5 of the drawings.

F designates a gravitating latch which is loosely connected with and disposed in the direction in which the belt-shipping lever $s$ is moved. G is a keeper for said latch, which is arranged on a support H, forming part of the main frame.

I is a lever which is fulcrumed on an arm $y$ of the support H (see Fig. 8) and has an arm $z$ normally resting on the support below the latch F and a depending arm $a'$, and J designates a pendent lever, which is also fulcrumed on the arm $y$ of the support H and has a screw $b'$ arranged to engage the arm $a'$ of the lever I. The pendent lever J in turn is arranged in the path of and is designed to be engaged by the faller-arm $c$ incident to the inward or winding-on movement of the carriage.

In the practical operation of my improvements the mechanism is so arranged that when the belt D is on the fast pulley $b$ the carriage B moves out or toward the quadrant C and said quadrant moves in the direction indicated by arrow in Fig. 1. As shown in said figure, the carriage has almost completed its outward movement and the quadrant has moved the pitman $i$, bell-crank lever $k$, pitman $n$, arm $p$, shaft $q$, lever $r$, and lever $s$ in the directions indicated by arrow, and thereby shifted the belt D from the fast pulley $b$ to the loose pulley $c$. When the belt is thus shipped from the fast pulley to the loose pulley, the gravitating latch F rides over and drops into engagement with the keeper G, and thereby retains the belt on the loose pulley. With this done the lever $r$ and the belt-shifting lever $s$ assume the relative positions shown in Fig. 5. At this time the gear $d$ is shifted into engagement with the friction-disk $a$ by mechanism, (not shown,) and the backing off of the spindles is effected.

When the carriage runs in and the quadrant is reversed—i. e., moved in the direction opposite to that indicated by arrow—the pitman $i$, lever $k$, pitman $n$, arm $p$, shaft $q$, and lever $r$ will be moved in directions opposite to those indicated by arrow, and in consequence the spring $x$ will be stretched or expanded after the manner shown in Fig. 5. This continues until the faller-arm $c'$ or any other suitable tappet on the carriage B impinges against the pendent lever J, when the lever I will be rocked and will lift the latch F out of engagement with the keeper G, and thus release the belt-shipping lever $s$ and enable the spring $x$ to retract and ship the belt from the loose pulley to the fast pulley. With this done the carriage is again caused to move outward, and the operation above described is repeated.

By virtue of the pitman $i$ being provided with a slot $h$ to receive the stud $g$ of the quadrant-crank and having the screw $j$ for the engagement of the said stud and also having the spring $m$ lost-motion between the quadrant-crank and the rock-shaft $q$ may be effectually prevented, such end being attained by properly adjusting the screw $j$ and the collar $l$ back of spring $m$.

It will be readily appreciated from the foregoing that the belt is gradually shifted to the loose pulley during the outward run of the carriage, and in consequence breakage of parts is avoided and frictional wear of both belt and friction-disk is avoided, as is also burning of the latter. At the same time the friction-disk, having only the momentum of the carriage to overcome, is enabled to quickly accomplish the backing off of the spindles. This contributes materially to the speed capabilities of the machine, as does also the quick shifting of the belt to the fast pulley on the inward or winding-on movement of the carriage.

Having thus described my invention, what I claim is—

1. A self-acting mule comprising a carriage, a belt-shifter, a movable device connected by intermediate mechanism with the carriage and arranged to engage and move the belt-shifter on one movement of the carriage and move away from the belt-shifter on the other movement of the carriage, a spring interposed between and connecting the belt-shifter and the movable device, suitable means for holding the belt-shifter in the position to which it is moved through the medium of the movable device, and suitable means for automatically releasing the belt-shifter, substantially as specified.

2. A self-acting mule comprising a carriage, a belt-shifter, a lever connected by intermediate mechanism with the carriage and arranged to engage and move the belt-shifter on one movement of the carriage and move away from the belt-shifter on the other movement of the carriage, a spring interposed between and connecting the belt-shifter and lever, a keeper, a latch connected to the belt-shifter and arranged to automatically engage the keeper, and a latch-releasing device arranged in the path of the carriage, substantially as specified.

3. A self-acting mule comprising a carriage, a belt-shifter, mechanism connected with the carriage for moving the belt-shifter in one direction incident to the run of the carriage in one direction; said mechanism being adapted to move in the opposite direction on the opposite movement of the carriage, a spring connecting the said mechanism and the belt-shifter, means for automatically securing the shifter subsequent to its movement through the medium of the said mechanism, and means operative by the last-mentioned movement of the carriage for releasing the belt-shifter, substantially as specified.

4. A self-acting mule comprising a carriage, a rock-shaft, mechanism intermediate of the carriage and rock-shaft, a belt-shifting lever loose on the rock-shaft, a lever fast on the rock-shaft arranged to engage and move the belt-shifting lever when the shaft is rocked in one direction and move independent of said shifting-lever when the shaft is rocked in the opposite direction, a spring connecting the belt-shifting lever and the fast lever, suitable means for holding the belt-shifting lever in the position to which it is moved through the medium of the lever, and suitable means operative by the carriage for automatically releasing the shifting-lever, substantially as specified.

5. A self-acting mule comprising a carriage, a quadrant connected and movable in concert with the carriage, a belt-shifter, a movable device connected by intermediate mechanism with the quadrant and arranged to engage and move the belt-shifter on one movement of the quadrant and move away from the belt-shifter on the other movement of the quadrant, a spring interposed between and connecting the belt-shifter and the movable device, suitable means for holding the belt-shifter in the position to which it is moved through the medium of the movable device, and suitable means for automatically releasing the belt-shifter, substantially as specified.

6. A self-acting mule comprising a carriage, a quadrant connected and movable in concert with the carriage, a belt-shifter, and mechanism intermediate of the belt-shifter and quadrant for moving the former from the latter, substantially as specified.

7. A self-acting mule comprising a carriage having a tappet, a quadrant movable in concert with the carriage, a rock-shaft connected by intermediate mechanism with the quadrant, a belt-shifting lever loose on the rock-shaft, a lever fast on said rock-shaft and arranged to engage the belt-shifting lever when moved in one direction, a coiled spring connecting the belt-shifting and fast levers, a keeper, a latch connected to the belt-shifting lever and arranged to automatically engage the keeper, and a latch-releasing device arranged in the path of the tappet on the carriage, substantially as specified.

8. A self-acting mule comprising a carriage carrying a tappet, a quadrant movable in concert with the carriage and having a crank on its shaft provided with a lateral stud, a bell-crank lever, a rock-shaft having an arm connected with one arm of the bell-crank lever, a pitman connected to the other arm of the bell-crank lever and having a slot receiving the stud on the crank and an adjustable screw to engage the stud, a spring interposed between the bell-crank lever and a collar on the pitman, a belt-shifting lever loose on the rock-shaft, a lever fast on said rock-shaft and arranged to engage the belt-shifting lever when moved in one direction, a coiled spring connecting the belt-shifting and fast levers, a keeper, a latch connected to the belt-shifting lever and arranged to automatically engage the keeper, and a latch-releasing device arranged in the path of the tappet on the carriage, substantially as specified.

9. A self-acting mule comprising a quadrant, a rock-shaft having an arm, a belt-shipping lever movable with the rock-shaft, and a bell-crank lever having one arm connected with the arm of the rock-shaft and its other arm connected with the quadrant, substantially as specified.

10. A self-acting mule comprising a quadrant having a crank on its shaft, a rock-shaft having an arm, a belt-shipping lever movable with the rock-shaft, a bell-crank lever having one arm connected with the arm of the rock-shaft, a pitman loosely connected to the other arm of the bell-crank lever and the quadrant-crank so as to play longitudinally with respect to the same, and a spring interposed between a collar on said pitman and the bell-crank lever, substantially as specified.

11. A self-acting mule comprising a quadrant, a rock-shaft, mechanism intermediate of the quadrant and the rock-shaft, a belt-shipping device loose on the rock-shaft, a lever fast on the rock-shaft arranged to engage and move the belt-shipping lever when the shaft is rocked in one direction and move independent of said shipping-lever when the shaft is rocked in the opposite direction, and a spring connecting the belt-shipping lever and the fast lever, substantially as specified.

In testimony whereof I have hereunto set my hand in presence of two subscribing witnesses.

WILLIAM HOWARD.

Witnesses:
GEO. W. SPAULDING,
E. LE ROY SPAULDING.